United States Patent
Ocak et al.

(10) Patent No.: US 11,240,351 B2
(45) Date of Patent: Feb. 1, 2022

(54) COMMUNICATIONS WITH CONSTRAINED DEVICES

(71) Applicant: Telefonaktiebolaget LM Ericsson (publ), Stockholm (SE)

(72) Inventors: Mert Ocak, Helsinki (FI); Ari Keränen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/770,993

(22) PCT Filed: Dec. 14, 2017

(86) PCT No.: PCT/EP2017/082866
§ 371 (c)(1),
(2) Date: Jun. 9, 2020

(87) PCT Pub. No.: WO2019/114972
PCT Pub. Date: Jun. 20, 2019

(65) Prior Publication Data
US 2020/0336569 A1    Oct. 22, 2020

(51) Int. Cl.
*G06F 15/16* (2006.01)
*H04L 29/06* (2006.01)
*H04W 4/70* (2018.01)
*H04W 4/50* (2018.01)
*H04L 29/08* (2006.01)

(52) U.S. Cl.
CPC .............. *H04L 67/42* (2013.01); *H04L 67/02* (2013.01); *H04L 67/12* (2013.01); *H04L 67/34* (2013.01); *H04W 4/50* (2018.02); *H04W 4/70* (2018.02)

(58) Field of Classification Search
CPC ......... H04L 67/42; H04L 67/02; H04L 67/12; H04L 67/34; H04W 4/70; H04W 4/50
See application file for complete search history.

(56) References Cited

U.S. PATENT DOCUMENTS

2017/0118574 A1* 4/2017 Park ..................... H04L 67/02
2017/0310742 A1* 10/2017 Jain ..................... H04L 67/34
(Continued)

FOREIGN PATENT DOCUMENTS

WO    2017040931 A1    3/2017

OTHER PUBLICATIONS

Shelby, Z. et al., "The Constrained Application Protocol (CoAP)", Internet Engineering Task Force (IETF), Jun. 1, 2014, pp. 1-112, RFC 7252, IETF.
(Continued)

*Primary Examiner* — Padma Mundur
(74) *Attorney, Agent, or Firm* — Coats + Bennett, PLLC (57) ABSTRACT

A standardised method is provided for enabling remote script execution on a constrained device. The method comprises transmitting a first Lightweight Machine-to-Machine, LWM2M, protocol message from a LWM2M protocol server to a LWM2M protocol client on the constrained device. A content of the first LWM2M message is such that the LWM2M protocol client has access to a script. The method also comprises transmitting information about execution of the script from the LWM2M protocol server to the LWM2M protocol client in a LWM2M protocol message.

18 Claims, 5 Drawing Sheets

(56) References Cited

U.S. PATENT DOCUMENTS

2019/0182098 A1* 6/2019 Ly .................. H04L 41/0213
2020/0412796 A1* 12/2020 Seed ................ H04L 67/10

OTHER PUBLICATIONS

Open Mobile Alliance, "Lightweight Machine to Machine Technical Specification", Technical Specification, Candidate Version 1.0, OMA-TS-LightweightM2M-V1_0-20160407-C, Apr. 7, 2016, pp. 1-127, OMA.

* cited by examiner

COMMUNICATIONS WITH CONSTRAINED DEVICES

TECHNICAL FIELD

This invention relates to a method of control of a constrained device.

BACKGROUND

One use of the Internet of Things (IoT) is in applications such as smart energy control and building automation. Uses such as these typically rely on Machine-to-Machine (M2M) devices, which tend to be deeply embedded and have much less memory and power supply than traditional internet devices. For example, the devices may have 8-bit microcontrollers with small amounts of ROM and RAM. These devices are referred to as constrained devices or constrained nodes. Moreover, the devices may communicate over constrained networks, such as IPv6 over Low-Power Wireless Personal Area Networks (6LoWPANs), which are typically low-power and lossy.

The Constrained Application Protocol (CoAP) is one example of a protocol designed for IoT applications in constrained nodes and constrained networks, using the fundamental Representational State Transfer (REST) architecture of the web. Thus, CoAP provides a request-response based RESTful communication architecture between constrained nodes or between constrained nodes and nodes in the Internet, and CoAP can easily be integrated to the web and web services by translating CoAP messages to Hyper Text Transfer Protocol (HTTP). The CoAP is described in "The Constrained Application Protocol", June 2014, https://tools.ietf.org/html/rfc7252.

The Open Mobile Alliance (OMA) Lightweight Machine-to-Machine (LWM2M) protocol is a light and compact device management protocol that is used for managing IoT devices and their resources. A version of the LWM2M protocol is described in "Lightweight Machine to Machine Technical Specification—Candidate Version 1.0—7 Apr. 2016". LWM2M runs on top of CoAP, which either uses UDP or SMS bindings. Hence, LWM2M is compatible with any constrained device which supports CoAP.

LWM2M defines three components:
LWM2M Client: It contains several LWM2M objects with several resources. LWM2M Server can execute commands on these resources to manage the client, commands such as to read, delete or update the resources. LWM2M Clients are generally the constrained devices.
LWM2M Server: It manages LWM2M Clients by sending management commands to them.
LWM2M Bootstrap Server: It is used to manage the initial configuration parameters of LWM2M Clients during bootstrapping the device.

To maintain the communication between mentioned components above, the following LWM2M interfaces are defined:
Bootstrapping: The LWM2M Bootstrap Server sets the initial configuration on the LWM2M Client when the client device bootstraps. There are four different bootstrapping methods: Factory Bootstrap, Bootstrap from Smartcard, Client Initiated Bootstrap and Server Initiated Bootstrap.
Client Registration: The LWM2M Client registers to one or more LWM2M Servers when the bootstrapping is completed.
Device Management and Service Enablement: The LWM2M Server can send management commands to LWM2M Clients to perform several management actions on LWM2M resources of the client. Access control object of the client determines the set of actions the server can perform.
Information Reporting: As a feature of CoAP Observe-Notify mechanism, LWM2M Clients can initiate the communication to the LWM2M Server and report information in the form of notifications.

Datagram Transport Layer Security (DTLS) is a protocol which provides communications privacy for datagram protocols. DTLS is based on Transport Layer Security (TLS) and offers equivalent security measures. Since DTLS is designed for datagram protocols, it is the most commonly used security protocol for CoAP and LWM2M messages.

Several scripting languages, such as Javascript, enable use of existing capabilities of the runtime to create new functionalities for the applications or the runtime itself. This is a common approach especially in the Internet with web browsers where scripts are pushed by the server and executed by the client. It is now recognised that it would be advantageous to enable remote scripting on constrained devices. However, there is currently no standardized way of enabling remote scripting in constrained devices and networks using CoAP and LWM2M. Rather, proprietary methods are used to upload and execute scripts on such constrained nodes. Considering the number and variety of devices in the network, proprietary methods do not scale as expected. For example, in the event that the device switches between management servers, the method for enabling scripting on the device may also change.

SUMMARY

An object of the invention is to provide a standardised method of enabling script execution on a constrained device.

According to the present invention there is provided a method of enabling remote script execution on a constrained device. The method comprises transmitting a first Lightweight Machine-to-Machine, LWM2M, protocol message from a LWM2M protocol server to a LWM2M protocol client on the constrained device, a content of the first LWM2M message being such that the LWM2M protocol client has access to a script. The method also comprises transmitting information about execution of the script from the LWM2M protocol server to the LWM2M protocol client in a LWM2M protocol message.

The step of transmitting a first LWM2M protocol message to a LWM2M protocol client, a content of the first LWM2M message being such that the LWM2M protocol client has access to a script, may comprise transmitting said script in the LWM2M protocol message.

The step of transmitting a first LWM2M protocol message to a LWM2M protocol client, a content of the first LWM2M message being such that the LWM2M protocol client has access to a script, may comprise transmitting in the LWM2M protocol message a resource indicator identifying a location from which the LWM2M protocol client is able to download said script.

The method may comprise transmitting said information about execution of the script to the LWM2M protocol client in said first LWM2M protocol message. Alternatively, the method may comprise transmitting said information about execution of the script to the LWM2M protocol client in a different LWM2M protocol message from said first LWM2M protocol message.

The information about execution of the script may comprise at least one rule for automatic script execution. The at least one rule for automatic script execution may identify at least one other resource on the constrained device. The at least one rule for automatic script execution may further identify at least one attribute of the at least one other resource on the device, such that the script is executed when the at least one other resource has said attribute.

The information about execution of the script may comprise at least one rule for use of an output of the script.

The information about execution of the script may comprise at least one input parameter for use by the script.

According to another aspect of the present invention, there is provided a method of performing script execution on a constrained device. The method comprises, at a Lightweight Machine-to-Machine, LWM2M, protocol client, receiving from a LWM2M protocol server a first LWM2M protocol message, a content of the first LWM2M protocol message being such that the LWM2M protocol client has access to a script. The method also comprises, at the LWM2M protocol client, receiving from the LWM2M protocol server information about execution of the script in a LWM2M protocol message.

The step of receiving a first LWM2M protocol message, a content of the first LWM2M protocol message being such that the LWM2M protocol client has access to a script, may comprise receiving said script in the LWM2M protocol message.

The step of receiving a first LWM2M protocol message, a content of the first LWM2M protocol message being such that the LWM2M protocol client has access to a script, may comprise receiving in the LWM2M protocol message a resource indicator identifying a location from which the LWM2M protocol client is able to download said script.

The method may further comprise receiving said information about execution of the script in said first LWM2M protocol message. Alternatively, the method may comprise receiving said information about execution of the script in a different LWM2M protocol message from said first LWM2M protocol message.

The information about execution of the script may comprise at least one rule for automatic script execution. The at least one rule for automatic script execution may identify at least one other resource on the constrained device. The at least one rule for automatic script execution may further identify at least one attribute of the at least one other resource on the constrained device, such that the script is executed when the at least one other resource has said attribute.

The information about execution of the script may comprise at least one rule for use of an output of the script.

The information about execution of the script may comprise at least one input parameter for use by the script.

According to other aspects of the present invention, there are provided computer programs and computer program products containing instructions for causing devices to operate in accordance with these aspects.

According to another aspect of the present invention, there is provided a server, the server comprising a processor, a memory, and an interface. The memory contains instructions executable by the processor, such that the server is operable to carry out a method of enabling remote script execution on a constrained device, the method comprising: transmitting a first Lightweight Machine-to-Machine, LWM2M, protocol message to a LWM2M protocol client on the constrained device, a content of the first LWM2M message being such that the LWM2M protocol client has access to a script; and transmitting information about execution of the script to the LWM2M protocol client in a LWM2M protocol message.

According to another aspect of the present invention, there is provided an endpoint device, the device comprising a processor, a memory, and an interface. The memory contains instructions executable by the processor, such that the device is operable to carry out a method of performing script execution on a constrained device, the method comprising: at a Lightweight Machine-to-Machine, LWM2M, protocol client on the device, receiving from a LWM2M protocol server a first LWM2M protocol message, a content of the first LWM2M protocol message being such that the LWM2M protocol client has access to a script; and, at the LWM2M protocol client, receiving from the LWM2M protocol server information about execution of the script in a LWM2M protocol message.

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
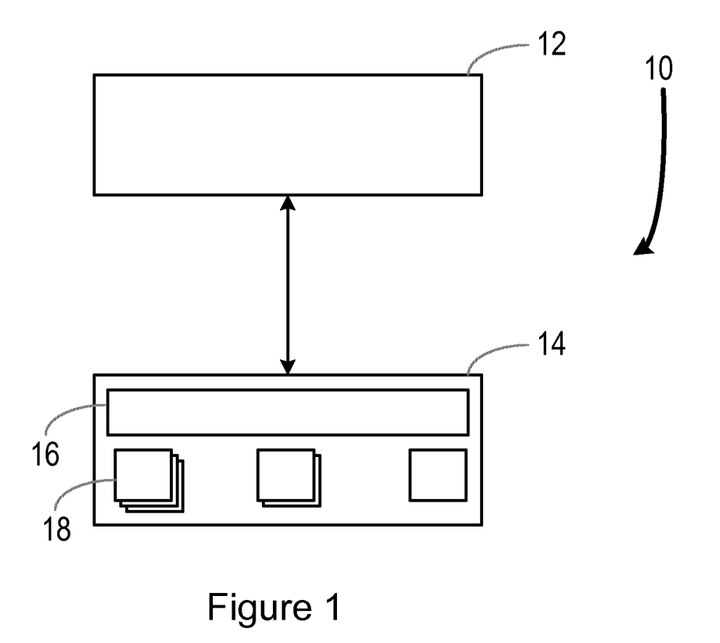
FIG. 1 illustrates a part of a communications network.

FIG. 1 illustrates a part of a network 10. In the network 10, a Lightweight Machine-to-Machine (LWM2M) management server 12 is able to communicate with a Machine-to-Machine (M2M) device 14, which is acting as an endpoint device in the network 10, and which may for example be in the form of a sensor or a controller. The M2M device 14 is running a LWM2M client 16, and includes other objects 18.

The M2M endpoint device 14 has less resources, for example less memory and power supply, than traditional internet devices. For example, it may have an 8-bit microcontroller with small amounts of ROM and RAM. Thus, the device 14 is referred to as a constrained device. Moreover, the device 14 may communicate over a constrained network, such as IPv6 over Low-Power Wireless Personal Area Networks (6LoWPANs), which are typically low-power and lossy.

The communication between the LWM2M management server 12 and the M2M device 14 uses interfaces for Bootstrapping, Client Registration, Device Management and Service Enablement, and Information Reporting.

The LWM2M communication between the LWM2M management server 12 and the M2M device 14 uses the Constrained Application Protocol (CoAP) with User Datagram Protocol (UDP) and Short Message Service (SMS) bindings. Datagram Transport Layer Security (DTLS) provides security for the UDP transport layer.

As mentioned above, the LWM2M protocol defines interfaces for Bootstrapping, Client Registration, Device Management and Service Enablement, and Information Reporting outlines interfaces for bootstrapping, client registration, information reporting, device management and enablement. There are also pre-defined LWM2M Object Models for performing such interface operations. The wording Object Model refers to representation of the data in a pre-defined format.

To provide semantic interoperability between different IoT systems, several approaches have been considered including Internet Protocol Smart Objects (IPSO) for data models and Sensor Markup Language (SenML) in IETF for data serialization. IPSO Smart Objects are based on the LWM2M object model and provides more generic and use case oriented data models to express sensor/actuator capabilities and sensor/actuator information. In CoAP, the device capabilities and device information are generically called resources. However it is possible to create a more canonical form of representation focusing on the data models and semantic information of the devices. For that, IPSO Object models may be used, in which information is represented as resources, e.g. measured value, maximum value, etc., which are grouped together as objects, e.g. temperature meter. There may be several instances of an object.

Figure 2:
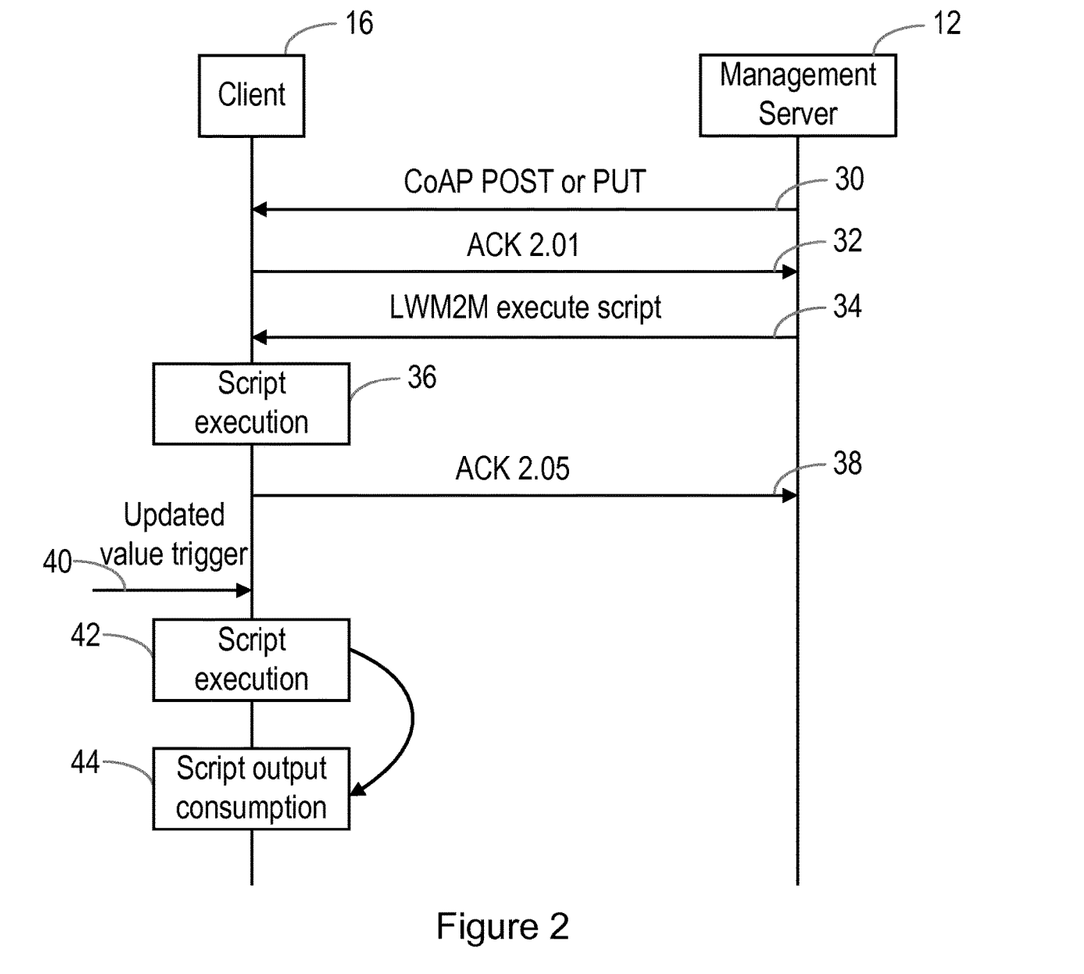
FIG. 2 illustrates messages in a method in the network of FIG. 1.

FIG. 2 illustrates a method of enabling scripting on a constrained device, for example in a constrained network, using CoAP and LWM2M standards. As discussed in more detail below, the method described allows the device management server to push scripts to the devices using standard methods which the device already supports, and to manage when and how such scripts are executed.

A script in this context can be any piece of code to be executed (interpreted) in the device runtime to automate the execution of a task or to obtain an output using the existing capabilities of the device. Possible scripting languages are, for example, Javascript, Perl, PHP, Unix shell scripts, amongst others. The method described herein is not specific to any particular scripting language but rather covers scripting generally.

The method allows different device management servers to use the same methods to manage scripting on all the devices supporting LWM2M. Further, the method requires minimal changes on the constrained device and, hence, can be readily adopted.

Interoperable systems between device management servers allow the management of multiple scripts running on the device.

FIG. 2 shows communications between the LWM2M protocol management server 12 and the LWM2M protocol client 16 running on the constrained M2M endpoint device 14 using the standard LWM2M protocol for constrained devices with CoAP and LWM2M support. The method may be used with any network supporting LWM2M.

Specifically, the LWM2M protocol management server 12 transmits a first LWM2M protocol message 30 to the LWM2M protocol client 16 on the constrained device 14. A content of the first LWM2M message is such that the LWM2M protocol client has access to a script.

In some embodiments, the method comprises transmitting the script in the LWM2M protocol message.

In other embodiments, the method comprises transmitting in the LWM2M protocol message a resource indicator identifying a location from which the LWM2M protocol client is able to download the script.

In addition, the LWM2M protocol server 12 transmits information about execution of the script to the LWM2M protocol client 16 in a LWM2M protocol message.

In this illustrated embodiment, the information about execution of the script is transmitted to the LWM2M protocol client 16 in the first LWM2M protocol message 30. In other embodiments, the information about execution of the script is transmitted to the LWM2M protocol client in a different LWM2M protocol message from the first LWM2M protocol message 30.

Thus, LWM2M is used in script enabling in constrained devices to manage the upload and execution processes of the script. The LWM2M protocol already allows device managers to push application data to the client using CoAP methods such as POST and PUT. Hence, in this example, the script upload to the client can be carried out using either the POST method or the PUT method. For script files, also the PATCH method can be used for partial updates. The message 30 thus sets up the script, and rules for execution of the script.

The information about execution of the script may comprise at least one rule for automatic script execution. For example, a rule for automatic script execution may identify at least one other resource on the constrained device. In that case, the rule for automatic script execution may further identify at least one attribute of at least one other resource on the device, such that the script is executed when the at least one other resource has that attribute.

To take one simple example by way of illustration, in a case where the constrained endpoint device is a temperature sensor, the object may be temperature, the resource may be the sensed temperature value, and the attribute may be a specific temperature value (for example a threshold value defined by the user). In that case, the rule for automatic script execution may identify that threshold as an attribute. When the sensed temperature value reaches that threshold value (that is, when that resource has that attribute), the script is executed.

In addition, or alternatively, the information about execution of the script may comprise at least one rule for use of an output of the script. For example, a rule for automatic script execution may identify at least one other resource on the constrained device, such that the script execution output is provided to the other resource.

Continuing the simple illustrative example from above, in the case where the constrained endpoint device is a temperature sensor, the resource is the sensed temperature value, and the attribute is a specific temperature value. When the script is executed because the sensed temperature value has reached the threshold value, the output of the script (i.e. the result of executing the script) can be written to another resource, which may for example be a heat valve opening resource of a heat valve object. As a further example, the script output can be used by another script. Thus, the first script result, namely the heat valve opening value, can be used by another script which calculates the energy consumption.

In addition, or alternatively, the information about execution of the script may comprise at least one input parameter for use by the script.

When the LWM2M protocol client 16 receives the first LWM2M protocol message 30, it sends an acknowledgement message 32. In the LWM2M protocol, the message 2.01 indicates that the required operation has been completed successfully.

value of at least one other resource on the device, such that the script is executed when the at least one other resource has that attribute or parameter value.

As described with reference to the example of the temperature sensor above, the updated value may be an indication that a resource has a particular attribute. Alternatively, the updated value may be the result of another script running on the device.

Therefore, as the input 40 has met the criterion for script execution, in step 42 the LWM2M protocol client 16 performs the required script execution. In this example, the script output is used by other resources on the device 14, as shown at step 44.

To acknowledge interoperability of this solution among all LWM2M nodes, a new object model in LWM2M is required for script execution enablement. This model should allow the management server both to push the script to the device and to execute it whenever required. One example of an LWM2M object model is as follows. In this example, the script sandbox is a secure virtual element (rather than a physical element) on the constrained endpoint device which only the LWM2M management server can update. It allows secure storage of the scripts and accepts input parameters for the script as well as exposes the output of the script execution.

| Name | Object ID | Instances | Mandatory | Object URN |
|---|---|---|---|---|
| Script Sandbox | TBD | Multiple | Optional | TBD |

The proposed object model should have the following resources for the requirements mentioned above.

| | Name | Operations | Instances | ID | Type | Range Or Enum | Unit | Description |
|---|---|---|---|---|---|---|---|---|
| 0 | Script | RW | Single | Optional | String | | | The script to be executed |
| 1 | Script URI | RW | Single | Optional | String | | | The URI that the device can download the script from |
| 2 | Execute | E | Single | Optional | | | | Executes the script, by using "Script" resource or by downloading the script using "Script URI" |
| 3 | Output | R | Single | Optional | Opaque | | | The script execution output |
| 4 | Triggers | RW | Multiple | Optional | Object Link | | | Link to script trigger object to determine when the script is executed automatically |
| 5 | Recipients | RW | Multiple | Optional | Object Link | | | Link to script output recipient object type to determine how to consume the script output |
| 6 | Input | RW | Multiple | Optional | Opaque | | | Input parameters used by the script |

In the first embodiment shown in FIG. 2, the LWM2M protocol server 12 transmits a separate LWM2M protocol message 34 to the LWM2M protocol client 16, requesting execution of the script.

As shown at 36 in FIG. 2, the LWM2M protocol client 16 performs the required script execution, and then sends an acknowledgement message 38. In the LWM2M protocol, the message 2.05 is also used to indicate that a required operation has been completed successfully.

In the second embodiment shown in FIG. 2, the LWM2M protocol client 16 receives an updated value from another resource on the device 14 in the input 40.

In this example, this updated value meets a particular criterion set by the LWM2M protocol management server 12 in the information about execution of the script. More specifically, in this example, a rule for automatic script execution has identified at least one attribute or parameter To trigger the automatic script execution and use of the script output in different resources, we introduce another object model "Script Trigger" to enable the device manager to create rules for how the script is executed automatically by using the values from other resources on the device.

The device manager creates such rules by the "Script Trigger" object given below and then uses object linking in the "Script Sandbox" object to refer to these rules.

| Name | Object ID | Instances | Mandatory | Object URN |
|---|---|---|---|---|
| Script Trigger | TBD | Multiple | Optional | TBD |

| ID | Name | Operations | Instances | Mandatory | Type | Range Or Enum | Unit | Description |
|----|------|------------|-----------|-----------|------|---------------|------|-------------|
| 0 | Trigger resource | RW | Single | Optional | String | | | The resource on the device which would trigger the script execution |
| 1 | Attributes | RW | Multiple | Optional | String | | | Defines the attributes for the resource to trigger the execution. Same set of attributes used in LWM2M Write Attributes (e.g. pmin, pmax etc) |

Another object model we introduce is a "Script Output Recipient" model, which can be used by the device manager to create rules for how the client should output the result of the execution of the script output, and how this output will be used by which resources on the device. The device manager creates such rules by the "Script Output Recipient" object and then uses object linking in the "Script Sandbox" object.

| Name | Object ID | Instances | Mandatory | Object URN |
|------|-----------|-----------|-----------|------------|
| Script Output Recipient | TBD | Multiple | Optional | TBD |

Figure 3:
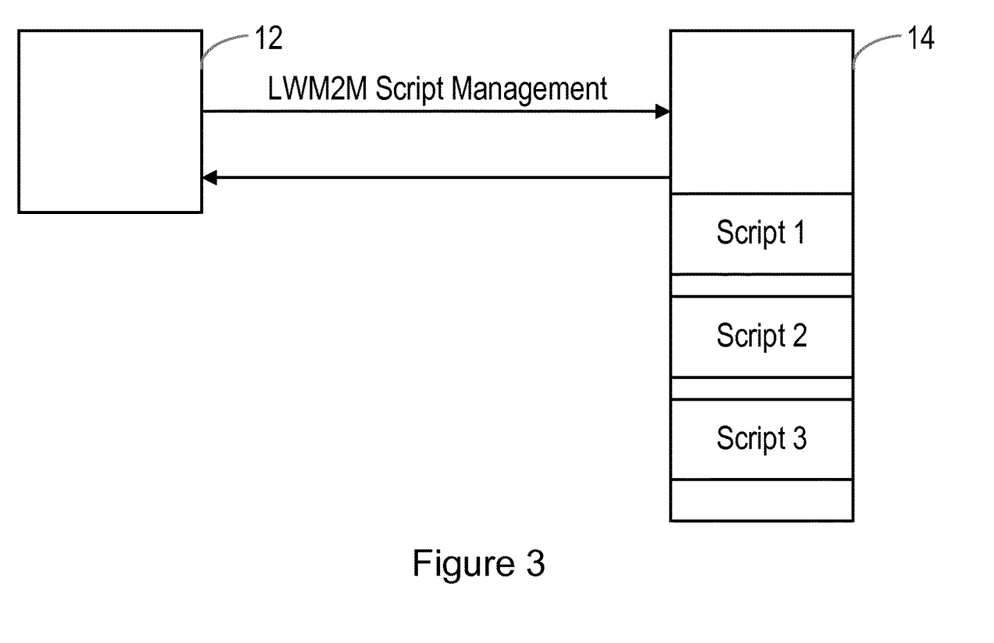
FIG. 3 is a schematic illustration of scripts on a constrained device.

The resources defined here as the "Recipient Resource" and "Recipient Operation" define which resources on the device receive the script output, and thus the process is controlled by the server. Thus, if the operation is "WRITE", the script output will be written to the given resource. Similarly, if the operation is "EXECUTE", the given resource will be executed. In the case of the illustrative example given above, where the constrained endpoint device is a temperature sensor, the resource is the sensed temperature value, and the attribute is a specific temperature value, the recipient resource may be the heat valve opening resource. Then, if the operation is "EXECUTE", the heat valve opening resource will be executed, that is, the heat valve will be opened.

ing and execution of multiple scripts, such as Script 1, Script 2, and Script 3 shown in FIG. 3.

Figure 4:
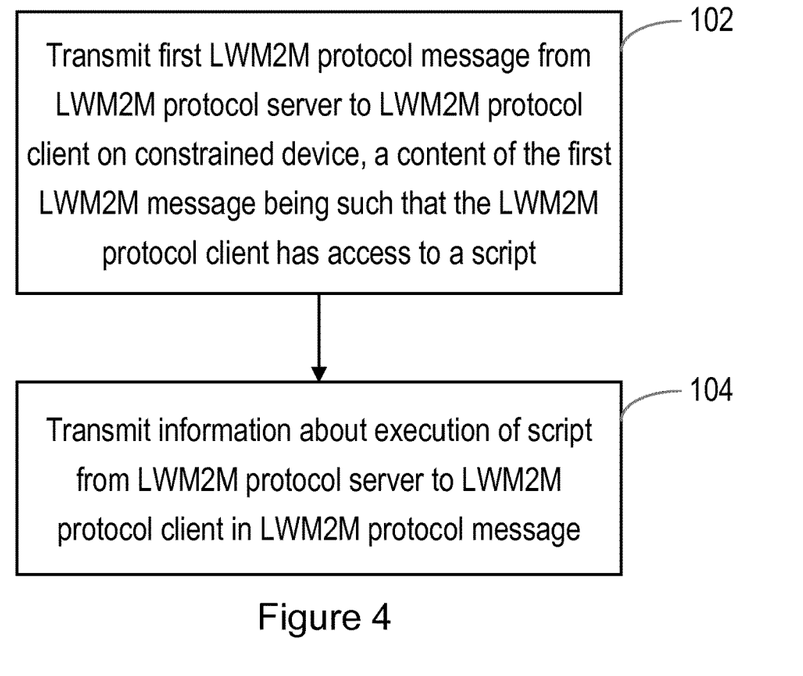
FIG. 4 is a flow chart, illustrating a method performed on a server.

FIG. 4 is a flow chart, illustrating a method performed in the LWM2M protocol server 12, for example a LWM2M management server, specifically a method of enabling remote script execution on a constrained device. The method comprises a first step 102 of transmitting a first LWM2M protocol message from the LWM2M protocol server to a LWM2M protocol client on the constrained device. A content of the first LWM2M message is such that the LWM2M protocol client has access to a script. The method further comprises a second step 104 of transmitting information about execution of the script from the LWM2M protocol server to the LWM2M protocol client in a LWM2M protocol message.

Figure 5:
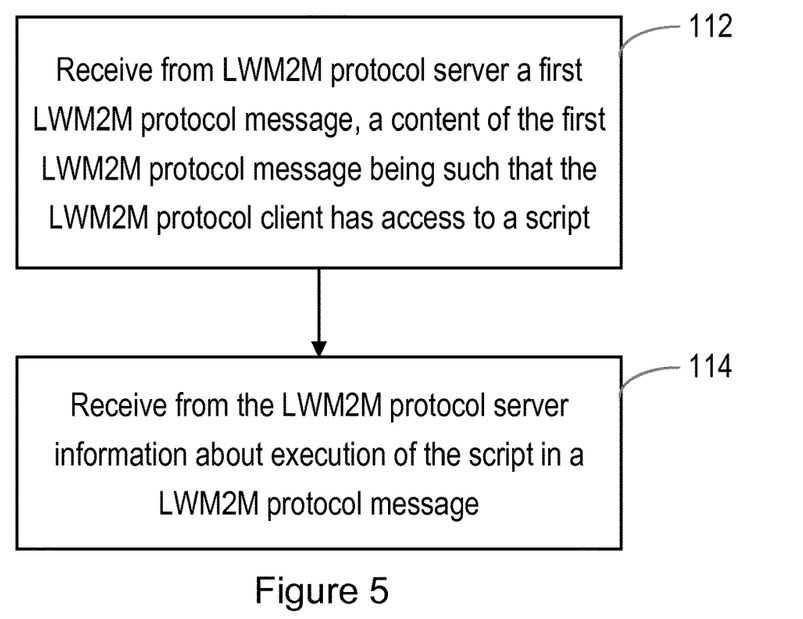
FIG. 5 is a flow chart, illustrating a method performed on an endpoint device.

FIG. 5 is a flow chart, illustrating a method performed in the client 16, specifically a LWM2M protocol client for example, for performing script execution on a constrained device. The method comprises a first step 112 of receiving from a LWM2M protocol server a first LWM2M protocol message, wherein a content of the first LWM2M protocol message is such that the LWM2M protocol client has access to a script. The method further comprises a second step 114 of receiving from the LWM2M protocol server information about execution of the script in a LWM2M protocol message.

Figure 6:
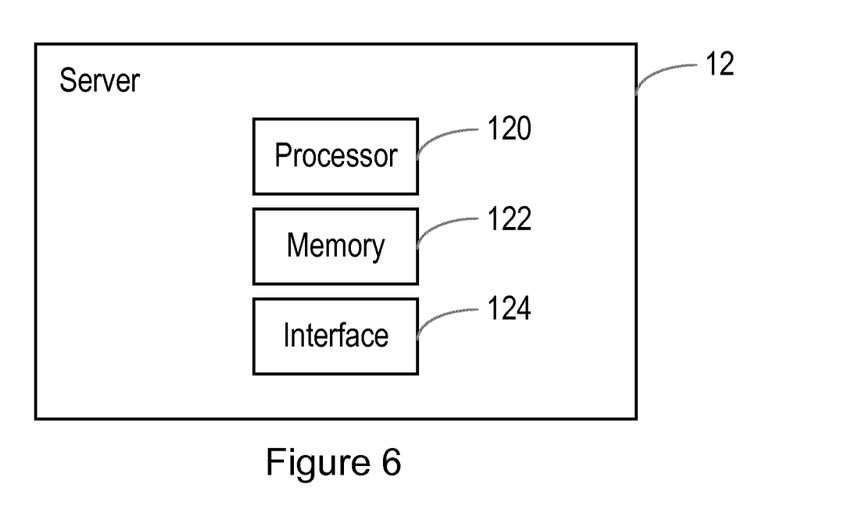
FIG. 6 illustrates a server.

FIG. 6 is a block diagram, illustrating a form of the server 12.

| ID | Name | Operations | Instances | Mandatory | Type | Range Or Enum | Unit | Description |
|----|------|------------|-----------|-----------|------|---------------|------|-------------|
| 0 | Script Output | R | Single | Optional | String | | | The script execution output |
| 1 | Recipient Resource | RW | Single | Optional | String | | | The resource on the device which would receive the script execution output |
| 2 | Recipient Operation | RW | Single | Optional | String | | | Operation to be performed on "Recipient Resource" if the "Trigger" resource is true. Allowed values: WRITE: Writes the script output in recipient resource EXECUTE: Executes the recipient resource. |
| 3 | Attributes | RW | Multiple | Optional | String | | | Defines the attributes for the resource when to use the script execution output i.e. when the script output satisfies these attributes. Same set of attributes used in LWM2M Write Attributes (e.g. pmin, pmax etc). |

Thus, the device manager can utilize this approach, using the given example data models, to manage the script upload and execution processes along with automatic execution and/or output handling. As mentioned previously, the data models given here are illustrative examples of models for enabling the remote script execution approach in constrained devices. Different data models can be used to provide the same interoperable approach.

FIG. 3 illustrates that an LWM2M protocol management server 12, in communication with an endpoint device 14, having an LWM2M protocol client, can control the upload- The server 12 has a processor 120, a memory 122, and an interface 124 for communicating with a device such as the device 14. The memory 122 contains instructions executable by the processor 120, such that the server is operable to carry out a method of enabling remote script execution on a constrained device, the method being as shown in FIG. 4.

The server 12 may comprise a first transmitting module, for transmitting a first Lightweight Machine-to-Machine, LWM2M, protocol message from a LWM2M protocol server to a LWM2M protocol client on the constrained device, a content of the first LWM2M message being such that the LWM2M protocol client has access to a script. The server may further comprise a second transmitting module for transmitting information about execution of the script from the LWM2M protocol server to the LWM2M protocol client in a LWM2M protocol message.

The modules may be implemented purely in hardware. Alternatively, the modules may be implemented purely in software. Alternatively, the modules may be implemented in a mix of hardware and software.

Figure 7:
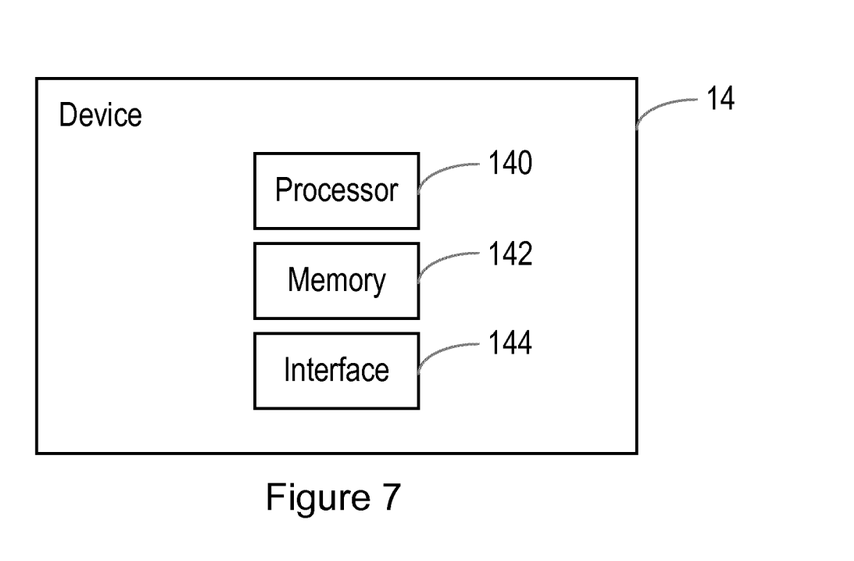
FIG. 7 illustrates an endpoint device.

FIG. 7 is a block diagram, illustrating a form of a constrained endpoint device 14.

The endpoint device 14 has a processor 142, a memory 144, and an interface 146 for communicating with a device such as the server 12. The memory contains instructions executable by the processor running an LWM2M protocol client on the device, such that the device is operable to carry out a method of performing script execution, the method being as shown in FIG. 5.

The endpoint device 14 may comprise a first receiving module for, at a Lightweight Machine-to-Machine, LWM2M, protocol client, receiving from a LWM2M protocol server a first LWM2M protocol message, a content of the first LWM2M protocol message being such that the LWM2M protocol client has access to a script. The endpoint device may further comprise a second receiving module for, at the LWM2M protocol client, receiving from the LWM2M protocol server information about execution of the script in a LWM2M protocol message.

The modules may be implemented purely in hardware. Alternatively, the modules may be implemented purely in software. Alternatively, the modules may be implemented in a mix of hardware and software.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of enabling remote script execution on a constrained device, the method comprising:
    transmitting a first Lightweight Machine-to-Machine (LWM2M) protocol message from a LWM2M protocol server to a LWM2M protocol client on the constrained device, wherein content of the first LWM2M protocol message configures the LWM2M protocol client to access a script; and
    transmitting information about execution of the script from the LWM2M protocol server to the LWM2M protocol client in a second LWM2M protocol message; and
    wherein the information about execution of the script comprises at least one rule for automatic script execution that identifies:
        at least one resource on the constrained device; and
        at least one attribute of the at least one resource on the device; and
    wherein the information about execution of the script configures the LWM2M protocol client to execute the script when the at least one resource has the attribute.

2. The method of claim 1, wherein the transmitting the first LWM2M protocol message to the LWM2M protocol client comprises transmitting the script in the first LWM2M protocol message.

3. The method of claim 1, wherein the transmitting the first LWM2M protocol message to the LWM2M protocol client comprises transmitting, in the first LWM2M protocol message, a resource indicator identifying a location from which the LWM2M protocol client downloads the script.

4. The method of claim 1, wherein the second LWM2M protocol message is the same as the first LWM2M protocol message.

5. The method of claim 1, wherein the second LWM2M protocol message is different from the first LWM2M protocol message.

6. The method of claim 1, wherein the information about execution of the script comprises:
    at least one rule for use of an output of the script; or
    at least one input parameter for use by the script.

7. A method of performing script execution on a constrained device, the method comprising a Lightweight Machine-to-Machine (LWM2M) protocol client on the constrained device:
    receiving, from a LWM2M protocol server, a first LWM2M protocol message, wherein content of the first LWM2M protocol message configures the LWM2M protocol client to access a script; and
    receiving, from the LWM2M protocol server, information about execution of the script in a second LWM2M protocol message, wherein the information about execution of the script comprises at least one rule for automatic script execution that identifies:
        at least one resource on the constrained device; and
        at least one attribute of the at least one resource on the device; and
    executing the script when the at least one resource has the attribute.

8. The method of claim 7, wherein receiving, from the LWM2M protocol server, the first LWM2M protocol message comprises receiving the script in the first LWM2M protocol message.

9. The method of claim 7, wherein receiving, from the LWM2M protocol server, the first LWM2M protocol message comprises receiving, in the first LWM2M protocol message, a resource indicator identifying a location from which the LWM2M protocol client downloads the script.

10. The method of claim 7, wherein the second LWM2M protocol message is the same as the first LWM2M protocol message.

11. The method of claim 7, wherein the second LWM2M protocol message that is different from the first LWM2M protocol message.

12. The method of claim 7, wherein the information about execution of the script comprises:
    at least one rule for use of an output of the script; or
    at least one input parameter for use by the script.

13. A server for enabling remote script execution on a constrained device, the server comprising:
    processing circuitry;
    memory containing instructions executable by the processing circuitry whereby the server is operative to:
        transmit a first Lightweight Machine-to-Machine (LWM2M) protocol message to a LWM2M protocol client on the constrained device, wherein content of the first LWM2M message configures the LWM2M protocol client to access a script; and
        transmit information about execution of the script to the LWM2M protocol client in a second LWM2M protocol message; and wherein the information about execution of the script comprises at least one rule for automatic script execution that identifies:
  at least one resource on the constrained device; and
  at least one attribute of the at least one resource on the device; and
wherein the information about execution of the script configures the LWM2M protocol client to execute the script when the at least one resource has the attribute.

14. An endpoint device operable to carry out a method of performing script execution, the endpoint device comprising:
  processing circuitry;
  memory containing instructions executable by the processing circuitry whereby the endpoint device is operative to, at a Lightweight Machine-to-Machine (LWM2M) protocol client on the endpoint device:
    receive, from a LWM2M protocol server, a first LWM2M protocol message, wherein content of the first LWM2M protocol message configures the LWM2M protocol client to access a script;
    receive, from the LWM2M protocol server, information about execution of the script in a second LWM2M protocol message, wherein the information about execution of the script comprises at least one rule for automatic script execution that identifies:
      at least one resource on the constrained device; and
      at least one attribute of the at least one resource on the device; and
    execute the script when the at least one resource has the attribute.

15. The server of claim 13 wherein the second LWM2M protocol message is the same as the first LWM2M protocol message.

16. The server of claim 13 wherein the second LWM2M protocol message is different than the first LWM2M protocol message.

17. The server of claim 14 wherein the second LWM2M protocol message is the same as the first LWM2M protocol message.

18. The server of claim 14 wherein the second LWM2M protocol message is different than the first LWM2M protocol message.

* * * * *